US 8,047,663 B2

(12) United States Patent
Pang et al.

(10) Patent No.: US 8,047,663 B2
(45) Date of Patent: Nov. 1, 2011

(54) BEAM DUMP FOR A VERY-HIGH-INTENSITY LASER BEAM

(75) Inventors: H. Yang Pang, San Jose, CA (US); Donald E. Harryman, Sunnyvale, CA (US); William Clayton Brand, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 610 days.

(21) Appl. No.: 11/903,631

(22) Filed: Sep. 24, 2007

(65) Prior Publication Data

US 2009/0080084 A1    Mar. 26, 2009

(51) Int. Cl.
*G02B 27/00*    (2006.01)
(52) U.S. Cl. ............... 359/614; 359/613; 219/121.6
(58) Field of Classification Search ........... 359/613, 359/885, 614; 219/121.6
See application file for complete search history.

(56) References Cited

U.S. PATENT DOCUMENTS

| 4,511,216 A | 4/1985 | Hsu et al. ............... 350/311 |
| 4,747,673 A | 5/1988 | Marrs et al. ............ 350/372 |
| 4,864,098 A | 9/1989 | Basanese et al. ....... 219/121.61 |
| 5,237,454 A | 8/1993 | Snyder ................... 359/602 |
| 6,497,490 B1 | 12/2002 | Miller et al. ............ 359/614 |
| 6,792,017 B2 | 9/2004 | Halpin ................... 372/35 |
| 7,071,444 B2 * | 7/2006 | Eigler et al. ........... 219/121.6 |
| 2006/0104592 A1 * | 5/2006 | Jenkins et al. .......... 385/140 |

* cited by examiner

*Primary Examiner* — Joshua L Pritchett
(74) *Attorney, Agent, or Firm* — Morrison & Foerster LLP

(57) ABSTRACT

A beam terminator for a high-power laser beam comprises a thermally conductive body including a beam-trapping chamber. A tapered spiral channel extends into the conductive body for guiding the beam. The beam is partially absorbed while propagating along the channel to the trapping chamber. What remains of the beam is absorbed in the trapping chamber.

10 Claims, 3 Drawing Sheets

BEAM DUMP FOR A VERY-HIGH-INTENSITY LASER BEAM

TECHNICAL FIELD OF THE INVENTION

The present invention relates in general to terminators or beam dumps for laser beams. The invention relates particular to a beam dump for a laser beam having a very high intensity, for example, 300 W or greater.

DISCUSSION OF BACKGROUND ART

High-power solid-state lasers that deliver very high intensity beams for laser machining operations, after being turned on can take up to 5 minutes to reach a stable operating condition. Accordingly during any relatively brief period between operations it is preferable not to turn the laser off. During this period the beam must be terminated, safely, at something other than a work-piece. The beam is terminated at what is usually termed a beam-dump, a beam-terminator or a beam-trap by practitioners of the art. A high-intensity, repetitively pulsed laser beam can reach an average power level from a few hundred (W) to several kilowatts (kW). This makes the design of a beam-terminator very challenging.

Several forms of beam terminators are described in the prior-art. By way of example, U.S. Pat. No. 4,864,098 discloses a beam dump in the form of a cone structure. When such a structure is used with a very high intensity beam, however, the tip of the cone can melt due to a large heat concentration. A simple multiple reflection beam dump arrangement is disclosed in U.S. Pat. No. 5,237,454. This structure arrangement is also susceptible to damage by a high-intensity beam as there is necessarily some beam absorption at each reflection and the first reflection is at near-normal incidence. U.S. Pat. No. 6,792,017 discloses an arrangement wherein a laser beam is trapped by a plurality of absorbing plates in an enclosure through which a cooling fluid is circulated. The beam accesses the enclosure through an optical window. While this arrangement is apparently relatively compact and effective in beam termination, the window could quickly become contaminated in an industrial environment. The contamination would absorb the laser beam which could lead to a run-away absorption condition with a risk of the window breaking and leaking cooling fluid.

It is believed that none of the prior art beam-terminating arrangements is practical for industrial or commercial use with very-high power beams. There is a need for a compact, efficient beam-terminator that has a minimum of operational components and is suitable for use in an industrial environment.

SUMMARY OF THE INVENTION

The present invention is directed to a terminator for a high-power laser beam. In one aspect, a beam-terminator in accordance with the present invention comprises a thermally conductive body having beam-trapping chamber therein. A curved channel extends into the conductive body. One end of the channel is arranged to receive the laser beam and the other end is in optical communication with the trapping-chamber.

In a preferred embodiment of the present invention the channel has a spiral form and has a width that is tapered over at least a portion of the length thereof and has a narrowest width in communication thereof with the trapping chamber. The channel has first and second opposite walls, with the first wall in the form of a spiral. An end loop of the first wall provides a wall of the trapping chamber. The second wall is shorter than the first wall and a space between an end of the second wall and the end loop of the first wall provides the optical communication with the trapping chamber.

In another aspect of the present invention, the walls of the channel are partially reflective and partially absorptive for the laser radiation and the channel is configured such that the laser beam received thereby propagates along the channel via a plurality reflections from the walls, with a portion of the beam being absorbed on each reflection and a residual portion entering the trapping chamber. The channel is further configured such that the first of the plurality of reflections is at grazing incidence and is also configured such that different portions of the beam undergo a different number of reflections as the beam propagates along the channel.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
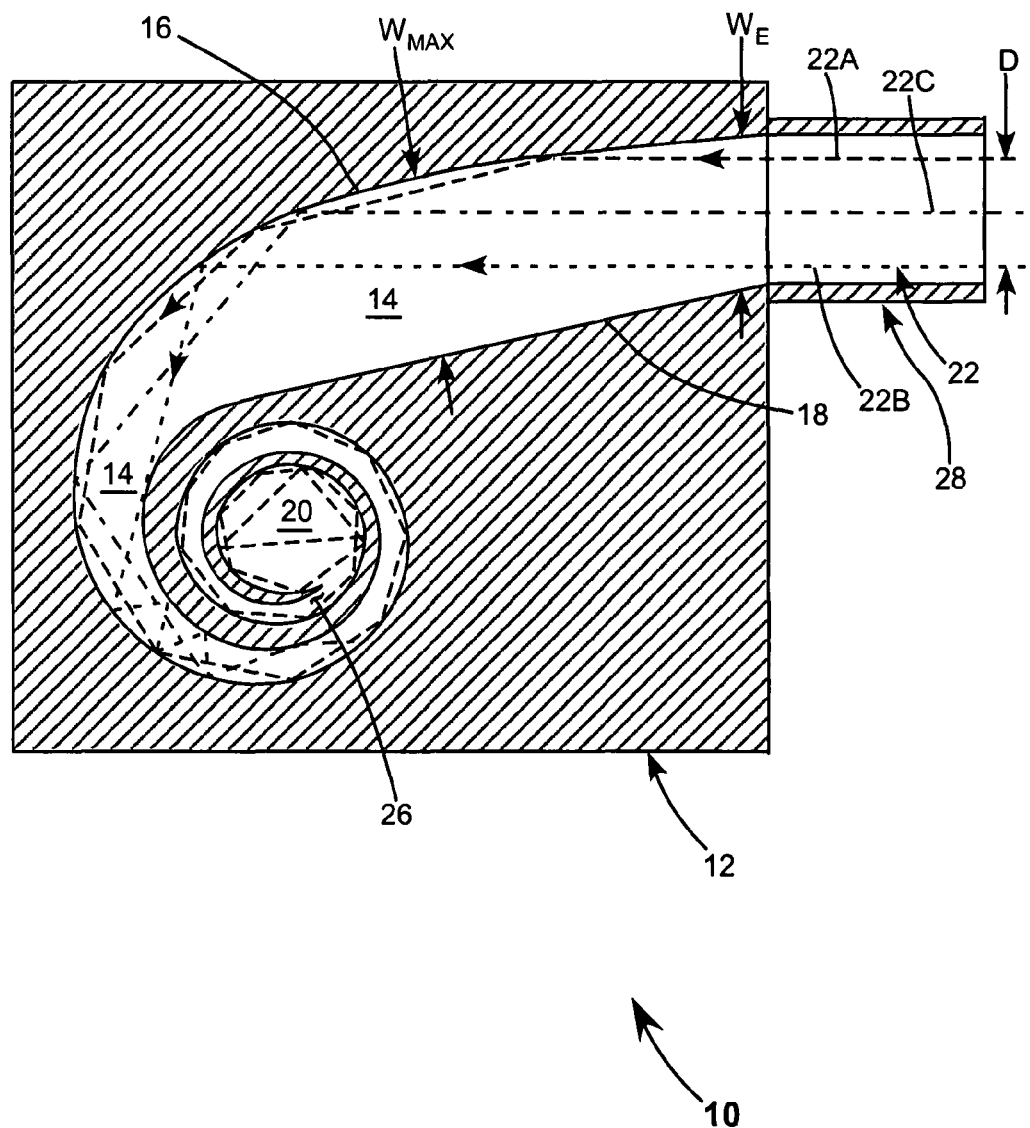
FIG. 1 schematically illustrates one preferred embodiment of a beam terminator in accordance with the present invention including a block of a thermally conductive material having a beam trapping chamber with a tapered spiral channel extending into the block from an edge thereof and making one and one-half loops before terminating in optical communication with the trapping chamber.

Referring now to the drawings, wherein like components are designated by like reference numerals, FIG. 1 schematically illustrates one preferred embodiment 10 of a beam-terminator in accordance with the present invention. Terminator 10 includes a body 12 of a thermally conductive material. Suitable materials include but are not limited to copper, copper alloys, aluminum, and aluminum alloys. It is even possible to construct the body from a thermally conductive ceramic such as beryllium oxide or boron nitride.

Included in body 12 is a beam trapping chamber 20. A curved channel 14 leads the beam to the beam trap. Channel 14 has opposite wall 16 and 18 that are used to guide the beam, through multiple reflections therefrom, toward chamber 20. Channel 14 has an entrance width $W_E$ larger than the diameter (or maximum dimension) D of a beam 22 being terminated such that radiation in the beam is entirely captured.

Beam channel 14 is configured to allow the beam to propagate in a forward direction only until what remains of the beam is trapped in chamber 20. To this end, the channel is curved preferably in a near-elliptical shape based approximately on a Cornu spiral or an Euler spiral. A characteristic of such spirals is that the curvature varies linearly with arc length, leading to a self-terminating circle, which circle, in the example of FIG. 1, defines chamber 20. The spiral shape of the walls 16 and 18 is preferably selected such that that channel 14 is tapered over a final portion thereof from a maximum width $W_{MAX}$ (larger than dimension D and $W_E$) to a minimum width in space 26 where wall 18 ends and wall 16 continues to form a wall of chamber 20. In this example, channel 14 makes one and one-half loops before terminating in optical communication with trapping-chamber 20.

Channel 14 is arranged such that wall 16 thereof receives beam 22 at about grazing incidence, or on average, at least relatively high angle of incidence, for example greater than about 45°. A beam guide-tube 28 is provided to facilitate beam alignment. It can be seen that different portions of the beam are incident on wall 16 at different angles of incidence, although all are high. Walls of the channel are made such that less than 100% of radiation is reflected. Preferably the reflected portion of radiation is between about 70% and 90% and such that correspondingly between about 30% and 10% is absorbed. The walls can be made reflective by polishing the walls, or by forming a reflective coating thereon. The average incidence angle of the beam on wall 16 is selected to maximize the area of the wall on which the beam is incident to minimize the power density on the wall and avoid optical damage thereto.

An effect of the curved tapered channel can be traced by following the path of certain portions of beam 22 in the channel. In FIG. 1 upper and lower extreme rays 22A and 22B are depicted by respectively dashed and dotted lines. A central or axial ray 22C is depicted by alternately dotted and dashed line. It can be seen that ray 22A reflects only from wall 16 and because of the spiral form of the wall is incident thereon each time at about the same, near-grazing angle of incidence. In chamber 20 the near grazing incidence also occurs until the end of wall 16 in chamber 20 is reached at which point subsequent reflections in chamber 20 occur at decreasing incidence angles essentially trapping the ray in the chamber. Extreme ray 22B after a second incidence on wall 16 is reflected onto wall 18 and thereafter is reflected from one wall to the other progressing toward trapping chamber 20. Central ray 16 makes three reflections from wall 16 before being incident on wall 18. In summary different portions of the beam make different amounts of reflections in progressing into the trapping chamber.

This effect causes the beam after the first reflection to progressively become spread over the channel walls even when some rays of the beam are incident at relatively low angles. This spreads the absorption and consequent heating over the length of the channel walls for better heat-distribution and for better removal of the distributed heat by conduction.

The beam, progressively diminishing in power, is forced into narrow entrance 26 of trapping chamber 20. The shape of the chamber allows the beam to bounce inside in one direction and eventually be absorbed in the chamber wall. The relative narrowness of the entrance minimizes the chance of radiation escaping from the light-trapping chamber. It should be noted that even with absorption at each reflection off the walls of only 10% significantly less than half of the beam power would enter trapping chamber.

It should be noted here that walls of the chamber and the channel are preferably as specular as possible in characteristics as it is the specular reflection that provides the desired guidance and trapping. Diffusely reflected or scattered light could be directed out of the channel and back toward the source of the beam.

Figure 2:
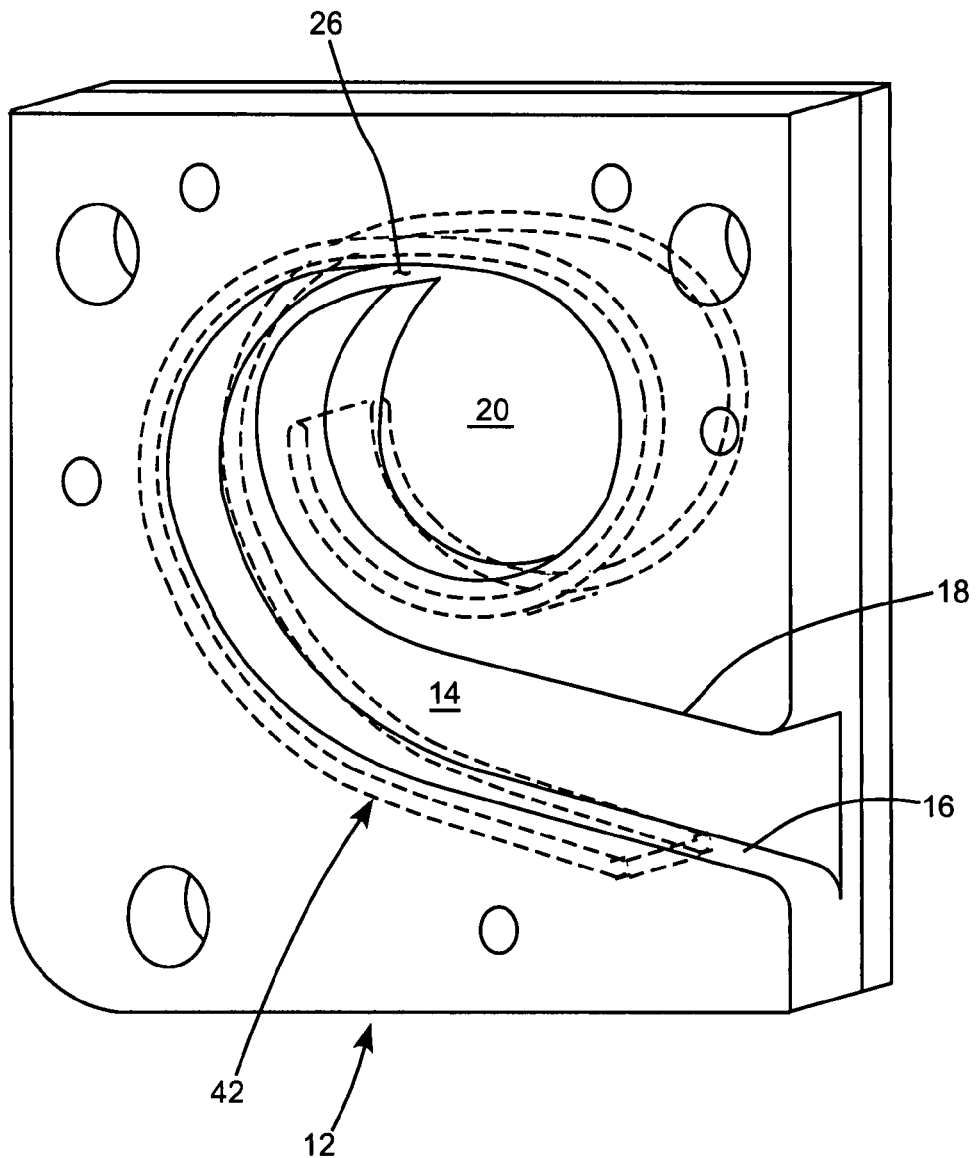
FIG. 2 is a three-dimensional view from one side schematically illustrating another preferred embodiment of a beam terminator in accordance with the present invention similar to the beam terminator of FIG. 1 but wherein the tapered channel makes only one-half of a spiral loop before terminating in optical communication with the trapping chamber and wherein there is a fluid cooling arrangement for walls of the channel and the trapping chamber.

FIG. 2 is three-dimensional view from one side, arbitrarily designated here as the "front" side schematically illustrating another preferred embodiment 40 of a beam terminator in accordance with the present invention. Terminator 40 is similar to the beam terminator of FIG. 1 with an exception that the tapered beam-guidance channel makes only one-half of a spiral loop before terminating in optical communication with the trapping chamber. Accordingly the channel, channel walls and the trapping chamber are designated by the reference numeral used in the description as beam terminator 10. In addition, there is provided a channel 42 configured for cooling the walls of channel 14 and chamber 20. This is depicted in phantom in FIG. 2. Further detail of cooling-channel 42 and fluid connections thereto are depicted in FIG. 3, which is a three-dimensional view from the "rear" side of terminator 40.

Figure 3:
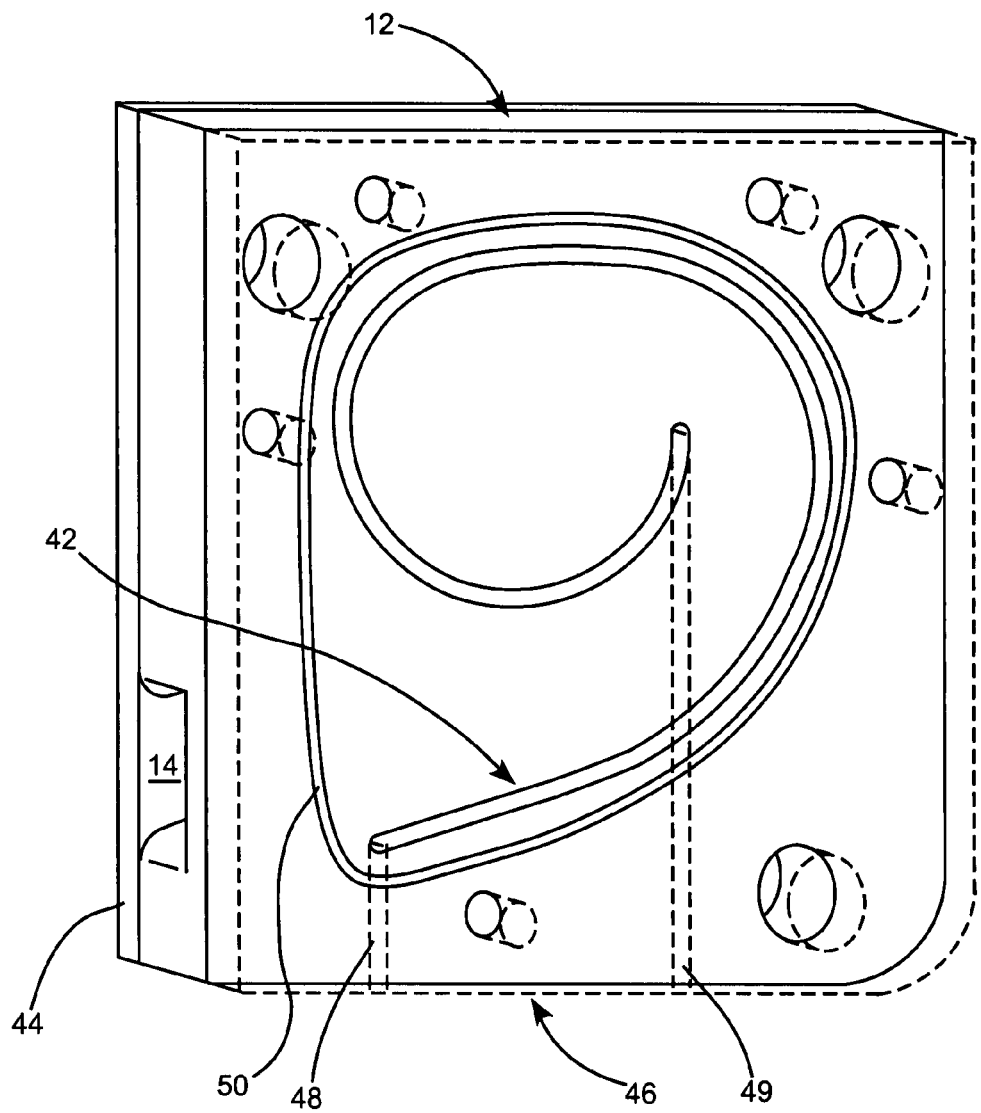
FIG. 3 is a three-dimensional view from an opposite side of the beam terminator of FIG. 2 schematically illustrating further detail of the fluid cooling arrangement.

Referring in particular to FIG. 3, thermally conductive body 12 has a front cover 44 (not shown in FIG. 2) for covering channel 14 and trapping-chamber 20. A rear cover plate 46, depicted in phantom in FIG. 3, covers cooling channel 42, which is machined into the thermally conductive body 12 on the side thereof opposite beam-guide channel 14. Cover 46 includes fluid connections 48 and 49 to channel 42 and engages a sealing ring 50 for preventing leakage of cooling fluid from the beam terminator assembly. It should be noted here that fluid connections to channel 42 are depicted in simplified form for convenience of illustration. Those skilled in the art may provide any suitable connections without departing from the spirit and scope of the present invention.

Thermal calculations were carried out for a specific hypothetical example of beam-terminator 40. In these calculations it was assumed that body 12 was made from copper (Cu). The height and width and thickness of the body were 4.0 inches, 4.0 inches, and 1.0 inches respectively. Spiral channel 14 was assumed to have a length of 10.0 inches and a maximum width of 0.75 inches and a minimum width (space 26) of 0.2 inches. Reflectivity and absorption of the channel walls 16 and 18 were assumed to be 90% and 10% respectively, which is about what can be expected for gold plated walls. Chamber 20 was assumed to Nickel plated, providing absorption of about 50%. The input beam was assumed to have an average power of (500 W) with a symmetrical, Gaussian intensity distribution therein. Water-cooling was assumed at a water input temperature t of 20° C. and a flow rate of 0.5 gallons per minute GPM.

The ambient temperature of the environment was assumed to be 21° C. The lowest temperature of the body was calculated to be about 305° K and occurred at the lower edge of the body. The highest temperature was calculated to be about 331° K and occurred near the entrance to chamber 20.

In summary, the present invention is described above in terms of a preferred and other embodiments. The invention is not limited, however, to the embodiments described and depicted. Rather, the invention is limited only by the claims appended hereto.

What is claimed is:

1. Apparatus for terminating a beam of laser radiation, comprising:
    a thermally conductive body having a first side and an opposite second side;
    a beam trapping chamber machined into the first side of the thermally conductive body;
    a separate curved channel machined into the first side of the conductive body, the channel having first and second opposite ends with the first end arranged to receive the laser beam and the second end in optical communication with the separate beam trapping chamber;

a fluid channel machined into the opposite second side of the conductive body, the fluid channel configured to flow a cooling fluid;

a first cover plate configured to cover the beam trapping chamber and the curved channel on the first side of the conductive body; and a second cover plate configured to cover the fluid channel on the opposite second side of the conductive body and to flow a cooling fluid to and from the fluid channel;

wherein the curved channel terminates at said second end and opens up into the separate beam trapping chamber.

2. The apparatus of claim 1, wherein the curved channel is tapered over at least a portion of the length thereof and has a narrowest width at the second end.

3. The apparatus of claim 2, wherein the curved channel has first and second opposite walls, with the first wall in the form of a spiral and an end loop of which provides a wall of the trapping chamber.

4. The apparatus of claim 3, wherein the second wall is shorter than the first wall and a space between an end of the second wall and the end loop of the first wall provides the optical communication with the trapping chamber.

5. The apparatus of claim 1, wherein the curved channel has first and second opposite walls, the walls being partially reflective and partially absorptive for the laser radiation and wherein the curved channel is configured such that the laser beam received thereby propagates along the curved channel via a plurality reflections from the walls, with a portion of the beam being absorbed on each reflection and a residual portion entering the trapping chamber.

6. The apparatus of claim 5, wherein the curved channel is further configured such that the first of the plurality of reflections is at grazing, incidence.

7. The apparatus of claim 6, wherein the curved channel is also configured such that different portions of the beam undergo a different number of reflections as the beam propagates along the channel.

8. The apparatus of claim 1, wherein the fluid channel is curved to conform to the curved channel machined into the first side of the conductive body.

9. An apparatus for terminating a beam of laser radiation comprising:

a thermally conductive body having a first side and an opposite second side;

a spiral channel machined into the first side of the body, with one end thereof defining a laser beam receiving opening, with a first portion of the channel near the receiving opening having cross-sectional dimensions larger than the cross-sectional dimensions of the receiving opening and with a second portion of the channel following the first portion of the channel having tapering cross-sectional dimensions and with the walls of the channel being configured to partially absorb radiation upon reflections of the laser beam propagating down the channel;

a separate beam trapping chamber machined into the first side of the body;

a fluid channel machined into the opposite second side of the body, the fluid channel configured to flow a cooling fluid;

a first cover plate configured to cover the spiral channel and the beam trapping chamber on the first side of the body; and a second cover plate configured to cover the fluid channel on the opposite second side of the body and to flow a cooling fluid to and from the fluid channel;

wherein said spiral channel terminates and opens up into the separate beam trapping chamber.

10. The apparatus of claim 9, wherein the fluid channel is a spiral that conforms to the spiral channel machined into the first side of the body.

\* \* \* \* \*